United States Patent [19]

Brummett

[11] Patent Number: 5,531,156
[45] Date of Patent: Jul. 2, 1996

[54] AUTOMATIC TACO MACHINE

[75] Inventor: Barry J. Brummett, Santa Ana, Calif.

[73] Assignee: Taco Bell Corp., Irvine, Calif.

[21] Appl. No.: 366,364

[22] Filed: Dec. 29, 1994

Related U.S. Application Data

[63] Continuation of Ser. No. 156,435, Nov. 23, 1993, abandoned.

[51] Int. Cl.$^6$ ................................................. A47J 37/00
[52] U.S. Cl. ..................... 99/450.1; 99/450.6; 99/450.7; 221/112; 221/150 HC; 221/298
[58] Field of Search ............................... 99/450.1, 450.7, 99/450.6, 427, 404; 221/96, 112, 289, 298, 150 HC, 150 A

[56] References Cited

U.S. PATENT DOCUMENTS

| | | | |
|---|---|---|---|
| 4,685,387 | 8/1987 | Hanson et al. | 99/450.1 |
| 5,085,138 | 2/1992 | Fehr et al. | 99/450.6 |
| 5,121,677 | 6/1992 | LeClaire et al. | 99/450.1 |

Primary Examiner—David Scherbel
Assistant Examiner—Reginald L. Alexander
Attorney, Agent, or Firm—Tilton, Fallon, Lungmus, Chestnut

[57] ABSTRACT

An automatic taco machine can automatically make both soft and hard tacos. Storage compartments for soft tortillas and hard taco shells are mounted above a V-shaped conveyor. A soft tortilla is removable from a stack of tortillas by a vacuum pick-up head and is heated and is inserted between a pair of heated plates where it is compressed and heated. A pusher bar moves downwardly through slots in the heater plates to fold the tortilla and push it onto the conveyor. A hot food dispenser and a cold food dispenser dispense hot and cold food onto the tortilla as it is moved by the conveyor. A hard taco shell is removable from a stack of taco shells by a reciprocably mounted peeler which separates the bottom taco shell from the stack and supports the stack while the bottom taco shell drops to the conveyor. The conveyor moves the taco shell past the hot and cold food dispensers.

14 Claims, 9 Drawing Sheets

AUTOMATIC TACO MACHINE

This is a continuation of application Ser. No. 08/156,435, filed on Nov. 23, 1993, now abandoned.

BACKGROUND

This invention relates to an automatic taco machine, and, more particularly, to an apparatus which automatically stores, dispenses, and fills tacos.

Mexican restaurants traditionally offer tacos which are filled with a variety of ingredients, for example, ground beef, lettuce, and cheese. Tacos can be made from soft wheat flour tortillas or relatively rigid corn meal tortillas (taco shells) which hold the ingredients.

Heretofore, the tortillas and taco shells have generally been filled manually. Tortillas are conventionally packaged in a stack of 24 flat tortillas. Each tortilla is manually peeled from the stack, positioned on a holder or support, and filled with the desired ingredients. Taco shells are relatively rigid and generally U-shaped and may be supplied in a nested stack. Again, each taco shell is manually removed from the stack and filled.

Manual preparation of tacos is acceptable in a conventional full service, sit-down restaurant. However, fast-food restaurants are required to prepare food items quickly and inexpensively. Manual preparation of tacos is labor intensive, expensive, and relatively time-consuming. A definite need exists for an automated device for making tacos quickly and inexpensively.

Attempts have been made to automate the preparation of tacos. However, these attempts have not been entirely successful. Automated handling of soft tortillas is particularly difficult because the stack of tortillas must usually be kept warm and moist. The warm, moist tortillas have a tendency to stick together, and it is extremely difficult for a machine to remove a single tortilla from the stack without tearing the tortilla. The rigid taco shells are more easily separated than tortillas, but the taco shells are fragile and are subject to breaking when handled mechanically.

In order to provide maximum efficiency, it is desirable that an automated taco machine handle both soft tortillas and hard tortillas or taco shells. However, because of the different storage and handling requirements for soft, flexible tortillas and hard, relatively inflexible taco shells, no prior machines have been able to fill both tortillas and taco shells in a satisfactory manner.

Tacos usually contain both warm ingredients, e.g., ground beef, and cold ingredients, e.g., lettuce and cheese. An automatic taco-making machine must also be able to store and dispense both hot and cold ingredients.

SUMMARY OF THE INVENTION

The invention provides an apparatus for automatically storing, dispensing, and filling tortillas and taco shells. Stacks of soft tortillas are supported on a plurality of tortilla trays which are supported on shelves in a cabinet. A vacuum head lifts a soft tortilla from one of the stacks and inserts the tortilla between two heated plates which compress and heat the tortilla. A stuffer bar then moves downwardly in slots in the plates to fold and move the heated tortilla to a V-shaped conveyor. The conveyor is provided by a plurality of endless plastic belts which are driven by pulleys. The conveyor moves the tortilla past dispensing stations where hot and cold ingredients are dispensed into the tortilla.

Taco shells are stored stacks in a separate heated compartment above the conveyor. One stack of taco shells is supported by a peeler mechanism, which engages the lowermost taco shell. When a taco shell is to be dispensed, the peeler mechanism peels the bottom taco shell downwardly away from the stack, and the taco shell falls to the V-shaped conveyor. The taco shell is moved by the conveyor past the hot and cold dispensing stations.

DESCRIPTION OF THE DRAWING

The invention will be explained in conjunction with illustrative embodiments shown in the accompanying drawing, in which.

DESCRIPTION OF SPECIFIC EMBODIMENT

For convenience, the invention will be explained with respect to a food product which is referred to as a taco. A taco generally includes an outer edible wrap and one or more inner ingredients which may include meat, lettuce, cheese, guacomole, sour cream, sauce, etc. The outer edible wrap can be a soft wheat flour tortilla, a hard corn meal tortilla (taco shell), or similar edible food material. The word "tortilla" as used herein includes both soft tortillas and hard taco shells. The word "taco" as used herein includes products which are generally referred to as tacos as well as other wrapped food products such as burritos and the like.

Referring first to FIGS. 1–6, a machine 50 for automatically making tacos includes a frame or chassis 51 on which is mounted a soft tortilla storage compartment 52, a hard tortilla or taco shell storage compartment 53, a hot food dispensing station 54, and a cold food dispensing station 55. A V-shaped conveyor 56 is mounted on the frame below the tortilla compartments and dispensing stations for conveying tortillas below the food dispensing stations.

Figure 8:
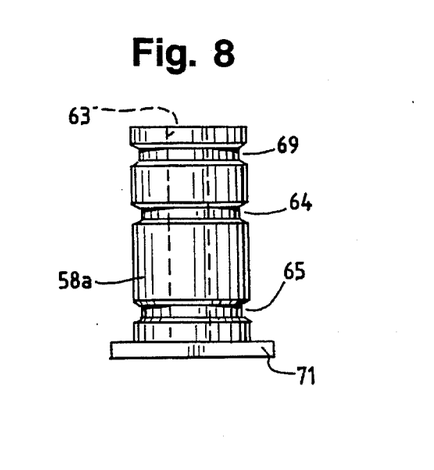
FIG. 8 is an elevational view of the drive pulley.

The conveyor 56 includes a first set of plastic pulleys or rollers 58 (FIG. 4), each of which is rotatably mounted on a metal axle or support rod 59, and a second set of plastic pulleys 60, each of which is mounted on an axle or rod 61. The two sets of axles 59 and 61 are angularly related and form an included angle of about 30° to 50°. Each of the pulleys 58 and 60 is generally cylindrical and is provided with a central bore 63 (FIG. 8) which receives the supporting axle and a plurality of annular grooves 64 in the outer surface.

Figure 7:
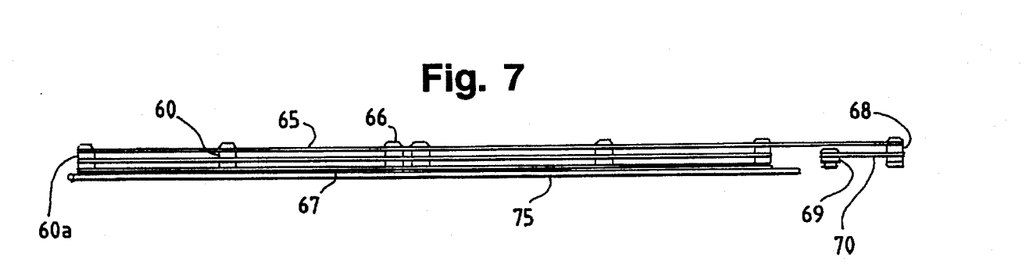
FIG. 7 is a sectional view taken along the line 7—7 of FIG. 5.

Three endless belts 65, 66, and 67 are entrained in the grooves 64 of the pulleys of each set. The two lower belts 66 and 67 loop around the two end pulleys 58a and 58b and 60a and 60b of each set (FIGS. 4 and 7) and contacts diametrically opposite points on the intermediate pulleys. The top belt 65 loops around the end pulley 58a and around an end pulley 68 (FIG. 7) in the packaging station for the tacos. The packaging station includes another pulley 69, and a short endless belt 70 loops around the pulleys 68 and 69.

Figure 6:
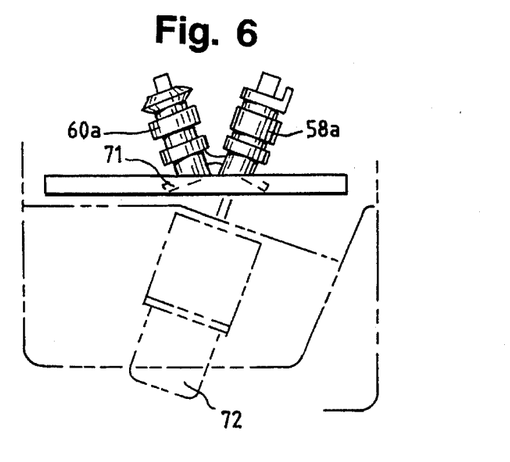
FIG. 6 is a end view taken along the line 6—6 of FIG. 3.

Each of the end pulleys 58a and 60a is provided with a gear 71 (FIG. 8) which mesh together (FIG. 6). A stepper motor 72 rotates the pulley 58a, and rotation of the pulley 58a causes rotation of the pulley 60a. The endless belts fit tightly over the pulleys, and rotation of the end pulleys 58a and 60a moves the endless belts which in turn rotate the other pulleys. The endless belts are preferably formed from silicone material which has some elasticity so that the belts can be stretched over the pulleys and tightly engage the pulleys.

The two sets of endless belts form a V-shaped trough 73 (FIG. 5) for conveying V-shaped tortillas. Each side of a V-shaped tortilla is supported by three endless belts.

Figure 5:
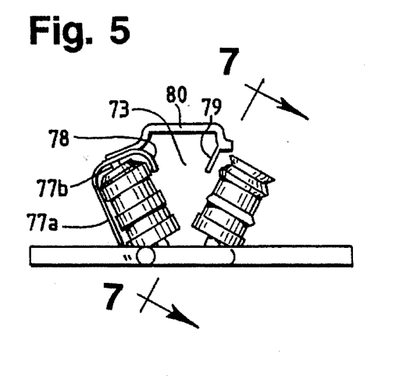
FIG. 5 is a end view taken of the conveyor along the line 5—5 of FIG. 3.

The axles 59 and 61 are supported by a pair of elongated horizontal rods 74 and 75 (FIG. 4), which are connected by cross rods 76. The conveyor belts and pulleys are protected by a stainless steel side cover 77 (FIGS. 3 and 5).

The cover includes a side portion 77a and a top portion 77b which is supported by the axles 59. A guide flange 78 extends downwardly from the top portion and is spaced from the pulleys 58 and the belts to form a channel through which the upper edge of a tortilla is conveyed by the belts. A similar guide flange 79 is spaced from the pulleys 60 and the belts and is supported by cross bars 80 which are secured to the top wall 77b of the cover.

Figure 2:
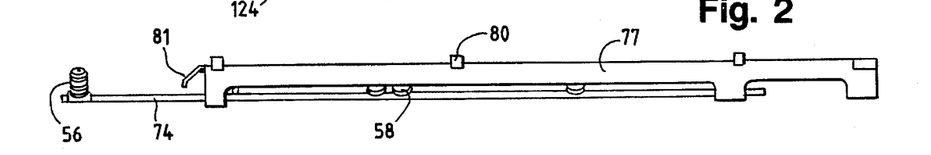
FIG. 2 is a side view of the conveyor.
Figure 3:
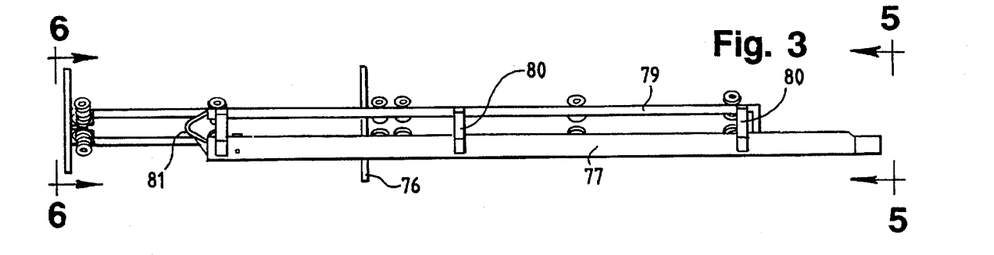
FIG. 3 is a top view of the conveyor.
Figure 4:
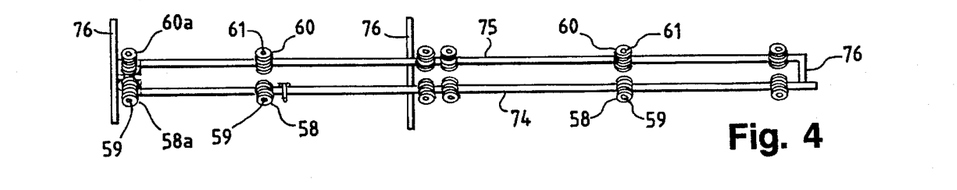
FIG. 4 is a top view of the conveyor with the cover removed.

Referring to FIGS. 2 and 3, a V-shaped plow 81 is attached to the leading end of the guide flanges 78 and 79. When a folded soft tortilla drops onto the conveyer, the plow 81 ensures that the folded tortilla opens into a V-shaped and guides the upper edges of the tortilla into the channels which are formed by the flanges.

Figure 1:
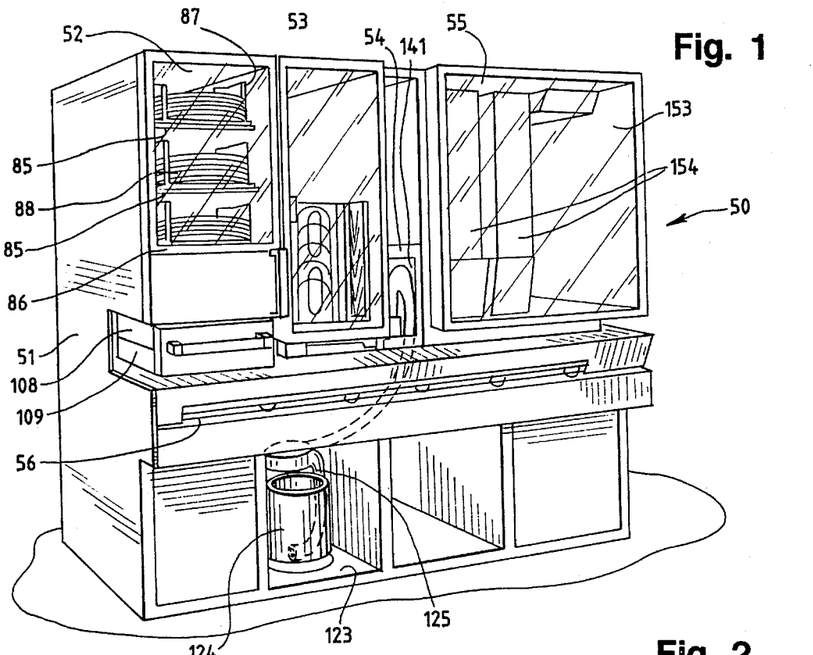
FIG. 1 is a perspective view of an automatic taco machine formed in accordance with the invention.
Figures 28, 29, 30, 31, 32:
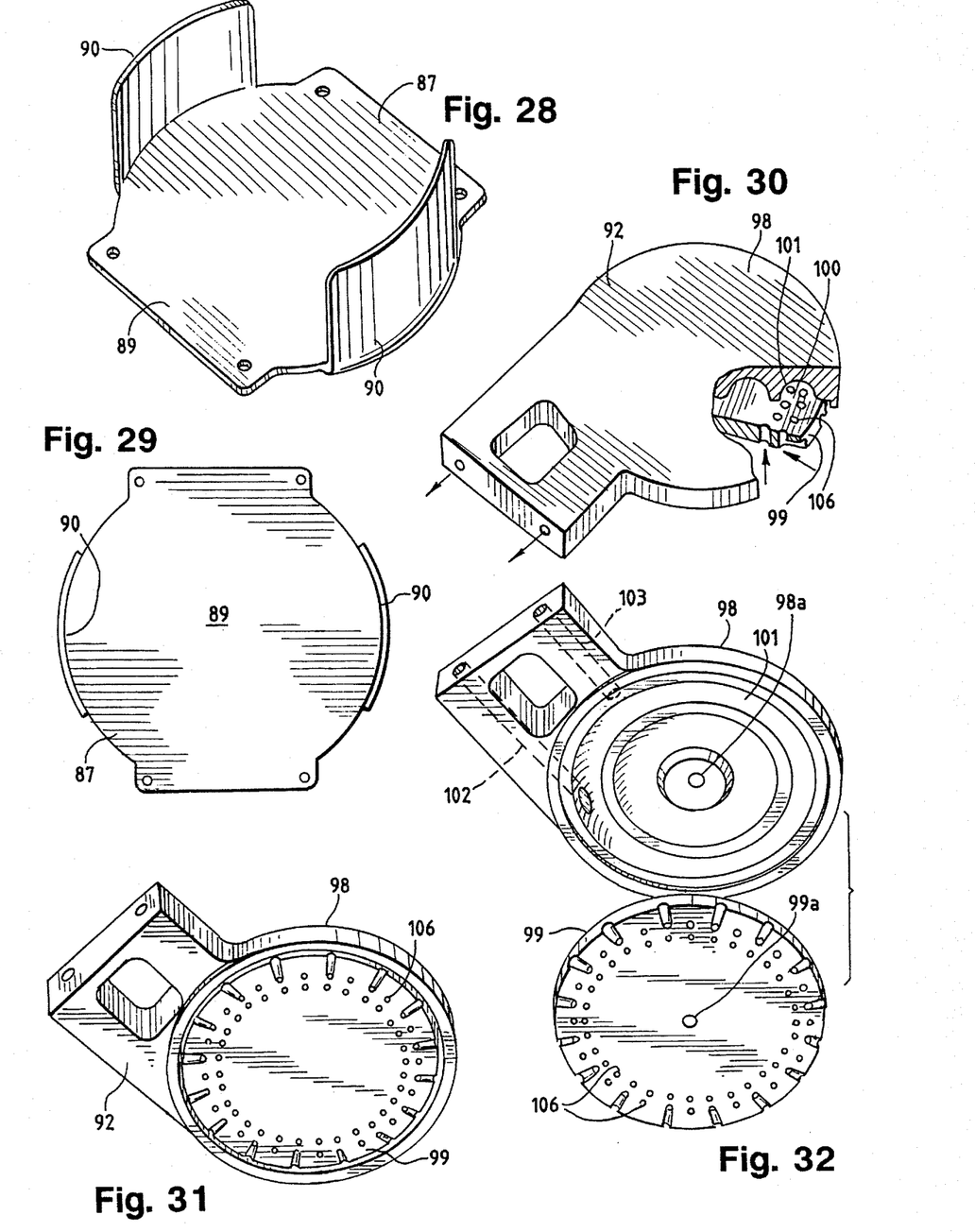
FIG. 28 is a perspective view of the soft tortilla holder.
FIG. 29 is a top view of the soft tortilla holder.
FIG. 30 is a fragmentary top perspective view of the vacuum pick up head.
FIG. 31 is a bottom perspective view of the vacuum pick up head.
FIG. 32 is an exploded perspective view of the vacuum pick up head.
Figures 33, 34, 35:
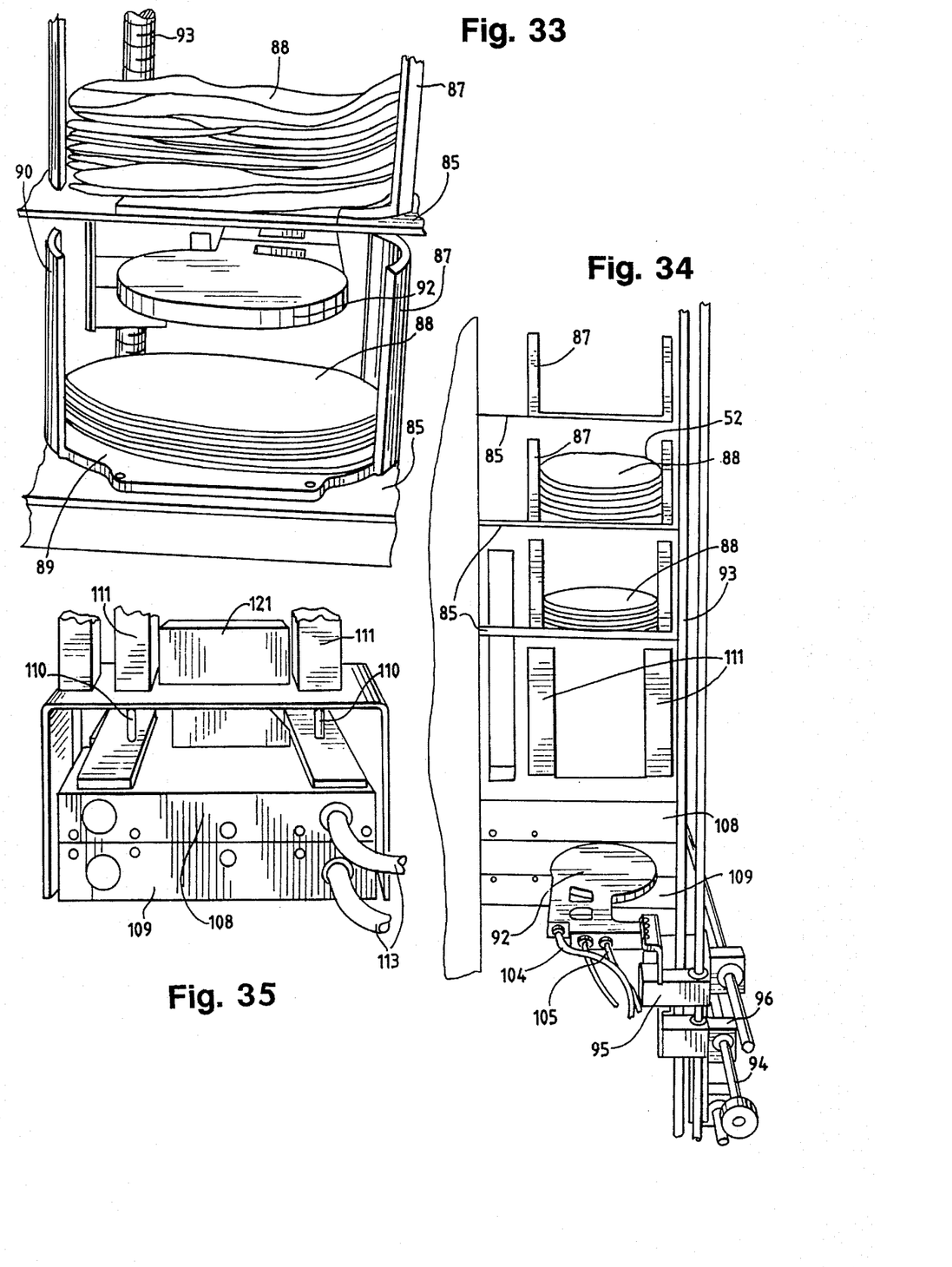
FIG. 33 is a fragmentary view of the soft tortilla storage compartment.
FIG. 34 is a rear fragmentary view of the soft tortilla storage compartment.
FIG. 35 is a fragmentary view of the heater for soft tortillas.

Referring to FIGS. 1, 33, and 34, the soft tortilla compartment 52 includes a plurality of shelves 85 and a hinged front door 86 for loading the compartment. A tortilla holder 87 is supported on each shelf and holds a stack of soft flour tortillas 88. Each tortilla holder includes a flat bottom plate 89 (see also FIGS. 28 and 29) and a pair of curved or arcuate side walls 90.

The top tortilla of a stack can be picked up by a vacuum pick up head 92 which is mounted for vertical movement on a vertical screw 93 at the rear of the compartment 52 (FIG. 34) and for horizontal movement on a horizontal screw 94. The screws 93 and 94 are threadedly engaged with carriages 95 and 96, respectively which support the pick up head 92, and rotation of either screw advances the carriage and pick up head along the length of the screw. Each screw is rotated by a stepper motor. Such screw conveyors are well known and conventional.

The vacuum pick up head includes top and bottom plates 98 and 99 (FIGS. 30–32) which are secured together by a threaded rod 99a that is mounted on the bottom plate 99 and screwed into a threaded hole 98a in the center of the top plate 98 to provide an annular interior chamber 100 (FIG. 30) which is defined by an annular groove 101 in the top plate. A suction pump or source of vacuum is connected to the chamber 100 by bores 102 and 103 which extend through the top plate 98 and hoses 104 and 105 (FIG. 34). The bottom plate 99 is provided with two concentric rings of holes 106 which communicate with the chamber 100. A tortilla can be lifted from one of the stacks by moving the pick up head to the top of the stack by the screw conveyors 93 and 94 and applying suction to the chamber 100 and holes 106.

The pick up head 92 and the tortilla which is adhered thereto by suction is moved by the conveyor screws 93 and 94 into the space between a pair of heater plates 108 and 109 (FIGS. 34 and 35). The upper heater plate 108 is supported by vertical reciprocation by a pair of rams 110 which are moved up and down by hydraulic cylinders 111 or some other suitable drive mechanism. After the tortilla is positioned over the lower heater plate 109, the tortilla is released by turning off the vacuum and blowing compressed air into the pick up head through one or both of the hoses 104 and 105.

The upper heater plate 108 is then lowered by the rams 110 to compress the tortilla between the two heater plates. The heater plates are heated by electrical resistance heating elements which are supplied with current by electrical conduits 113. The tortilla is heated by the heater plates, and additional heating may be caused by compression forces. The heater plates are advantageously heated to about 350° F. and exert a compression force of about 15 psi. Since the soft tortillas are individually heated by the heater plates, the storage compartment 52 does not need to be heated and can be at room temperature. The tortillas in the stacks 88 are more easily separated if they are at room temperature.

Figures 36, 37:
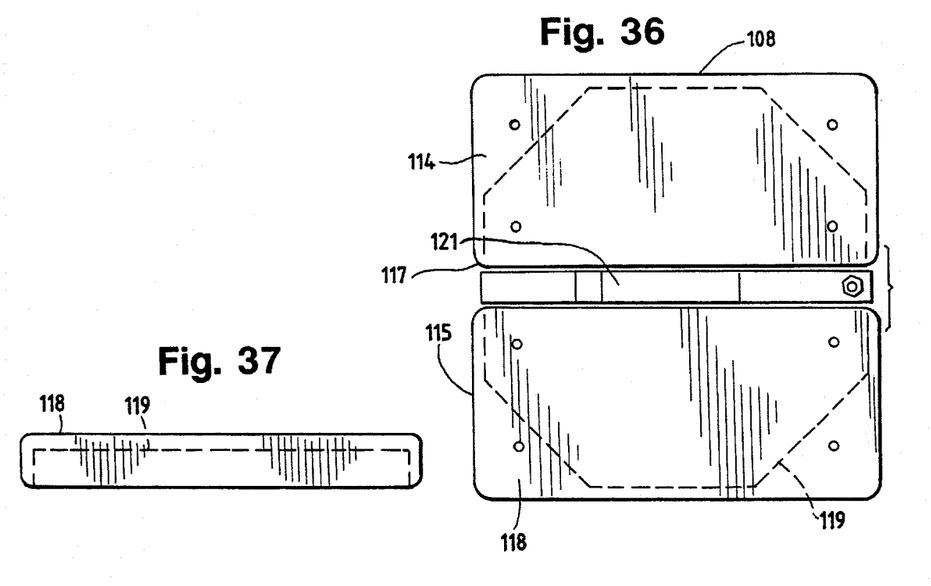
FIG. 36 is a top plan view of one of the heater plates.
FIG. 37 is a side view of one of the heater plates.

Referring to FIGS. 36 and 37, the top heater plate 108 includes front and rear portions 114 and 115 which are separated by a central slot 117. Each portion of the heater includes an outer rectangular casing 118 and a semi-octagonal plate 119 which contains the heating element. The bottom heater plate 109 is similarly formed. The heater plates include type R thermocouples to maintain the temperature and by-metallic thermocouples to prevent the heater plates from overheating in the event that the type R thermocouples fail.

Figure 38:
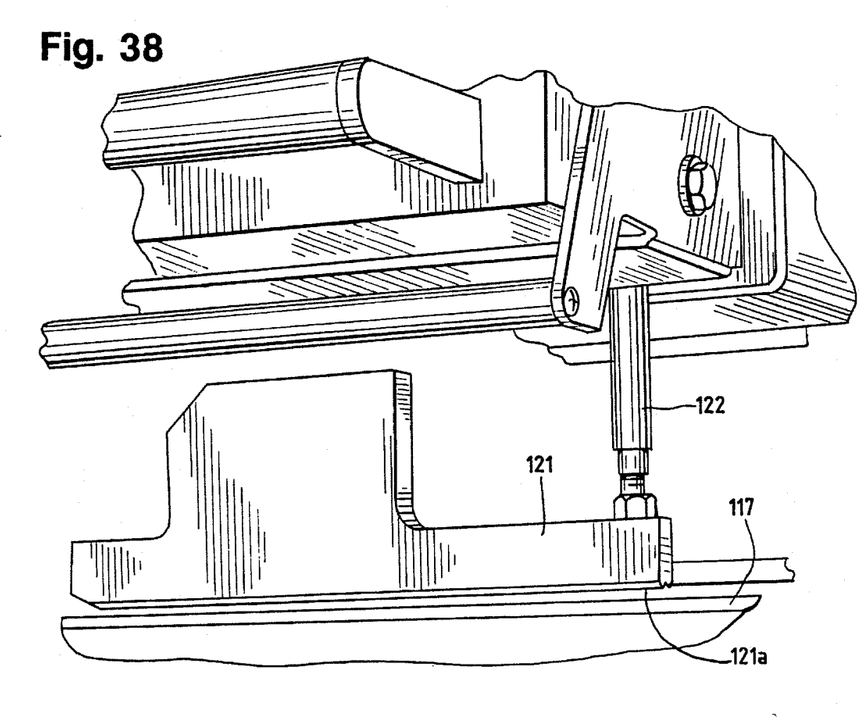
FIG. 38 is a fragmentary perspective view of the stuffer bar for soft tortillas.

A stuffer bar 121 (FIGS. 35, 36, and 38) is mounted for vertical reciprocation into the slots of the heater plates by a ram 122 which is powered by a hydraulic cylinder or the like. When the tortilla between the heater plates is heated to the desired temperature, which may take only a few seconds, the stuffer bar 121 is lowered through the slots in the heater plates to push the tortilla downwardly toward the conveyor 56. The stuffer bar has grooves 121a along the bottom to prevent the tortilla from slipping as it is stuffed through the bottom heater plate onto the conveyer. As the tortilla is pushed through the slot in the bottom heater plate, it is folded into a generally V shape, and the V shape is maintained by the V-shaped trough which is formed by the endless belts of the conveyor.

The V-shaped tortilla is advanced by the conveyor to the hot food dispensing station 54. The particular hot food dispensing station illustrated dispenses ground beef, but other types of hot food can also be dispensed.

Referring to FIGS. 1 and 20–22, the frame 51 includes a heated storage compartment 123 which holds a container 124 of ground beef. A tube 125 extends from the bottom of the container through a lid 126 on the container, through a pump 127, to the dispensing station 54. The first section 125a of the tube between the bottom of the container and the pump is formed from stainless steel, and the remainder of the tube is formed by a plastic hose 125b. The meat bucket and the pump are mounted on a frame which slides into and out of the machine 50. The pump and turntable drives have snap-in quick disconnects, and the frame snaps into position.

Figure 20:
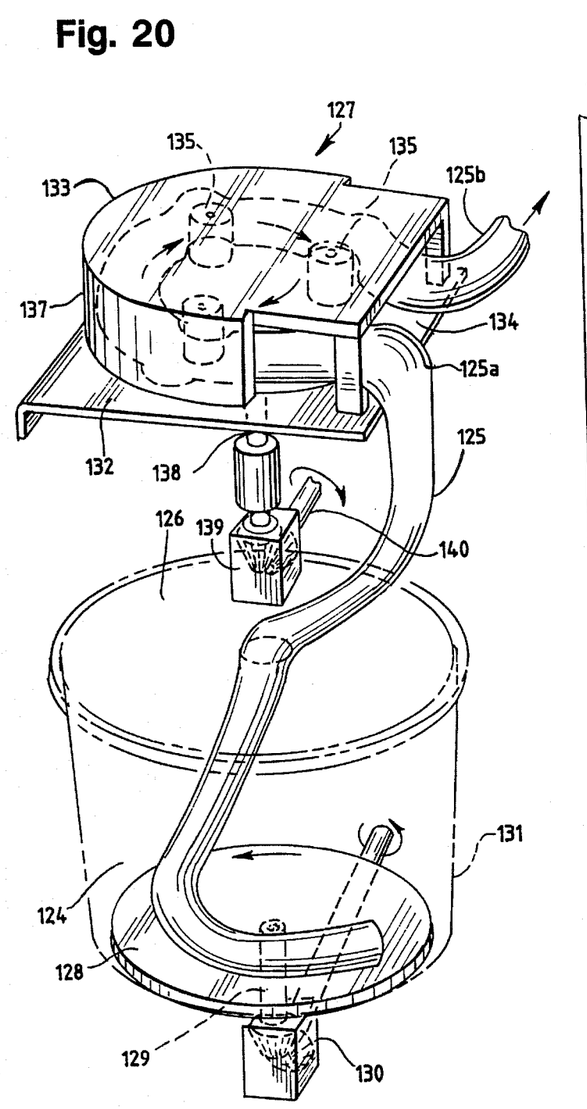
FIG. 20 is a fragmentary perspective view of the meat pump.
Figure 21:
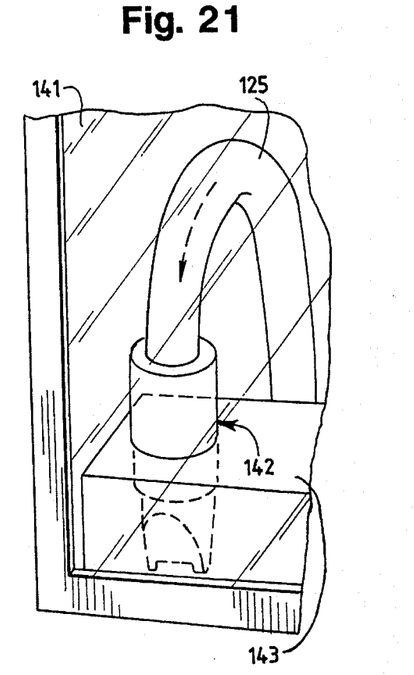
FIG. 21 is a fragmentary perspective view of the meat dispensing compartment.

The particular container illustrated is mounted on a turntable 128 for rotational movement relative to the tube 125 and lid 126. The turntable is rotated by a shaft 129 which is rotated by gear mechanism 130 and drive shaft 131. The drive shaft is rotated by a stepper motor mounted outside of the compartment 123. Rotation of the container relative to the tube 125 mixes the contents of the container and maintains a uniform temperature.

The particular pump 128 illustrated is a peristaltic pump which pumps meat through the tube without contacting the meat. The pump includes a bottom plate 132, a housing 133, a rotatable plate 134 within the housing, and rollers 135 on the plate which compress the tube 126 against the side wall 137 of the housing. The plate 134 is rotatable by a shaft 138, gear mechanism 139, drive shaft 140, and another stepper motor. As the plate rotates, the rollers 135 force meat within the tube 126 in the direction of the arrows.

The hot food dispensing station 54 includes a heated compartment 141 (FIGS. 1 and 21) into which the tube 126 extends. The end of the tube is connected to a dispensing nozzle assembly 142 which is mounted in a heated metal block 143. The dispensing assembly 142 includes a tubular metal housing 144 (FIG. 22) which has a tapered bottom end 145 with an elongated slot 146. An elastomeric duckbill valve 147 is mounted within the housing and provides a check valve or one-way valve for the meat which is pumped through the tube 126. The duckbill valve includes a tubular portion 148 and a pair of converging lips or flaps 149 which are separated by a slit 150. When the pump 128 is operating, the meat forces the lips 149 apart to dispense meat through the slit 150. Before the pump stops, the pump motor reverses to rotate the plate 134 by ⅓ revolution, and the lips 149 sealingly engage and prevent meat from dripping.

Figure 22:
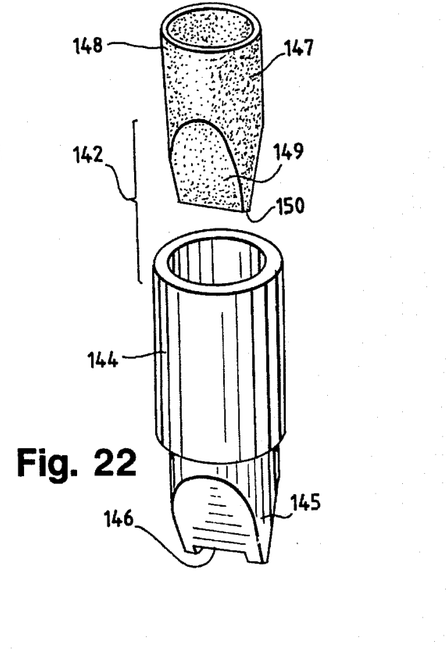
FIG. 22 is an exploded perspective view of the meat dispensing nozzle.

The dispensing nozzle 142 is mounted in a hole in the heated block 143 so that the valve assembly and the meat inside the valve assembly is maintained at the desired temperature. The block 143 can be heated by electrical resistance elements or the like. In one specific embodiment the compartment 123 was maintained at 165° F. and the dispensing nozzle was maintained at 170° F.

The meat pump is activated by a sensor adjacent the conveyor, for example, a photoelectric cell, which senses the approach of a tortilla. The stepper motor which drives the pump is timed relative to the location of the sensor and the speed of the conveyor so that meat is dispensed continuously just after the leading edge of the tortilla passes the dispensing nozzle until just before the trailing edge of the tortilla passes.

The cold food dispensing station 55 includes a refrigerated compartment 153 (FIG. 1) which is maintained at 40° F. in which two or more dispensing assemblies 154 are mounted. Referring to FIGS. 23–27, each of the dispensing assemblies 154 includes a frame 155, a motor-driven vibrating tray 156 on the frame, and a weighing and dispensing cell 157. A hopper 158 is mounted on the frame above the vibrating tray 156, and a pair of rollers are rotatably 159 mounted with the hopper. A plastic storage bin 160 with an open bottom is removably mounted on top of the hopper.

Figures 23, 25, 26, 27:
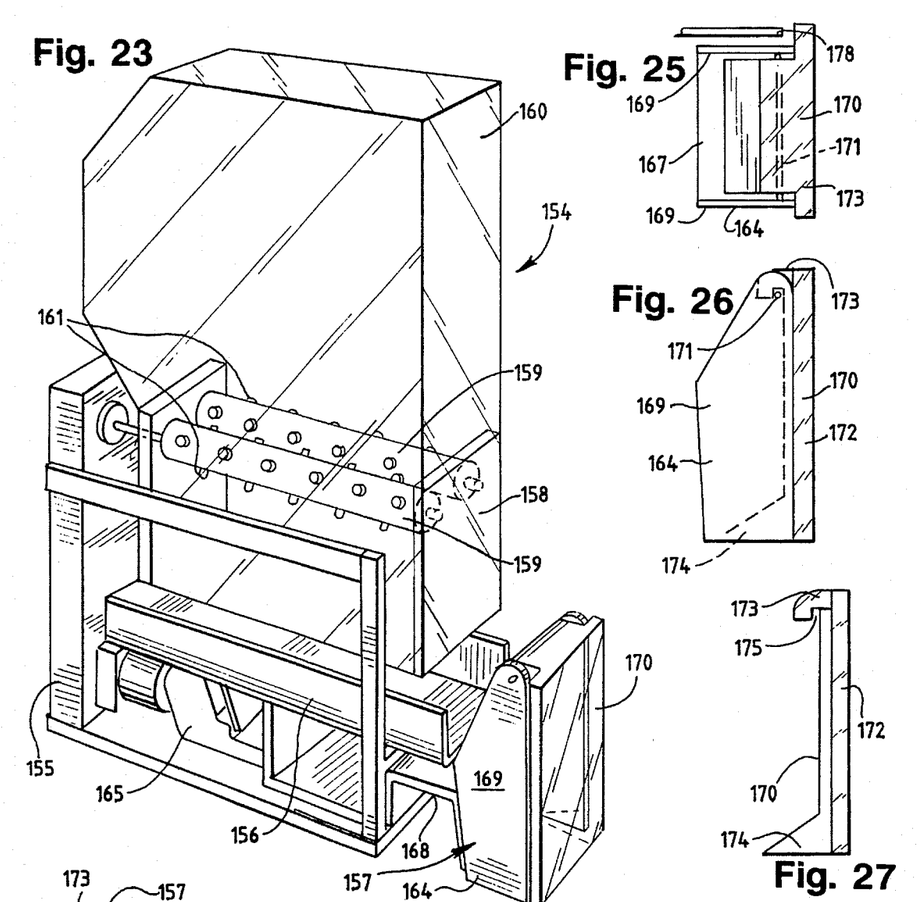
FIG. 23 is a perspective view of one side of one of the cold food dispensers.
FIG. 25 is a fragmentary top view of the weighing and dispensing cell.
FIG. 26 is a side view of the weighing and dispensing cell.
FIG. 27 is a side view of the gate of the weighing and dispensing cell.
Figure 24:
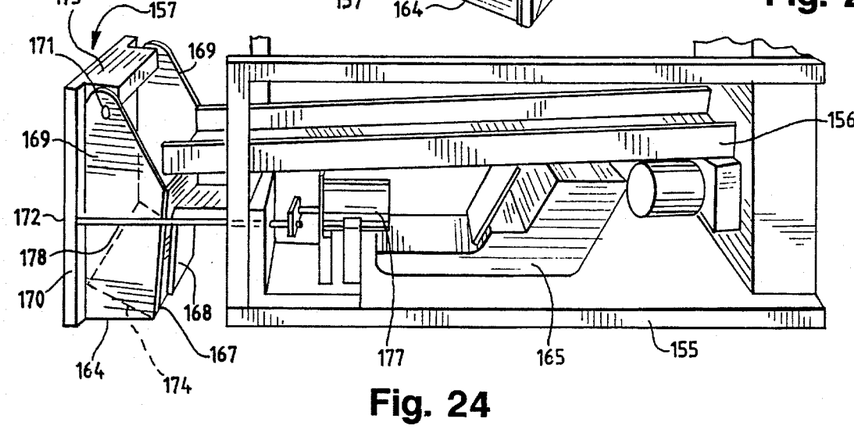
FIG. 24 is a fragmentary perspective view of the other side of the cold food dispensers.

The storage bins of the two dispensing assemblies can be filled with different cold ingredients. For example, one bin can be filled with shredded lettuce and the other bin can be filled with grated cheese. The rollers 159 are rotated by a suitable power source, and each roller includes a plurality of radially extending cylindrical projections 161. As the rollers and the projections rotate, lettuce or cheese is dispensed onto the vibrating tray 156. The vibrating tray is vibrated by a commercially purchased vibrator mechanism below the tray. The tray is inclined toward the weighing and dispensing cell 157, and as the tray vibrates, the food on the tray moves toward the cell and drops over the end of the tray into the cell.

The weighing and dispensing cell includes a three-sided metal chute 164 which is mounted on a weighting apparatus 165 on the frame 155. The weighing apparatus is also a commercially vended item and measures the weight of the weighing and dispensing cell, including the food in the cell. When the cell contains the desired amount of food, for example, ½ ounce of lettuce or ¼ ounce of cheese, the weighing apparatus deactivates the vibrator mechanism so that no additional food falls into the cell.

The three-sided chute 164 includes a back wall 167 which is attached to a support bracket 168 on the weighing apparatus 165 and a pair of side walls 169. A molded plastic gate 170 is pivotally mounted on a rod 171 which extends between the upper ends of the side walls 169. The gate 170 includes a generally vertically extending wall 172 which forms the front wall of the cell 167, a support bracket 173 which is mounted on the rod 171, and a ledge 174 which normally contacts the back wall 167 of the chute 164. Referring to FIGS. 26 and 27, the ledge 174 is provided with a groove 175 which fits onto the rod 171 so that the gate can be easily removed for cleaning.

The weight of the gate is such that the gate will remain closed with the ledge 174 contacting the back wall 167 when the cell 157 is filled with the desired amount of food. The ledge 174 extends rearwardly beyond the pivot rod 171 and acts as a counterweight to assist in keeping the gate closed.

Another sensor adjacent the conveyor senses the approach of a tortilla to the cold food dispensing assemblies. For example, a photoelectric cell can be used to differentiate between a tortilla which contains meat and a tortilla which erroneously was not filled with meat. The cold food dispensers will be activated only if the tortilla contains meat.

The sensor activates a solenoid 177 (FIG. 24) on the frame 155 which extends a push rod 178. The push rod engages the edge of the gate 170 which extends beyond the side wall 164 of the chute and pivots the gate so that the contents of weighing and dispensing cell are dumped onto a tortilla on the conveyor below the cell. A separate sensor can be used for each dispensing cell, or the same sensor can be used for both cells with an appropriate timing mechanism which times the movement of the conveyor so that each cell is dumped when the tortilla is below the cell.

The refrigerated compartment 153 (FIG. 1) has space for additional dispensing devices for other cold food, for example, sour cream, tomatoes, guacomole, sauce, etc. The hot food pump can also be used to dispense other types of hot food, and additional hot food dispensing stations can be added. The apparatus can therefore be adjusted to prepare a variety of menu items.

Referring now to FIGS. 9–19, the taco shell storage compartment 53 includes a bottom wall or shelf 181 and a hinged front door 182. The taco shell storage compartment is preferably heated to about 165° F.

Figures 9, 10, 11:
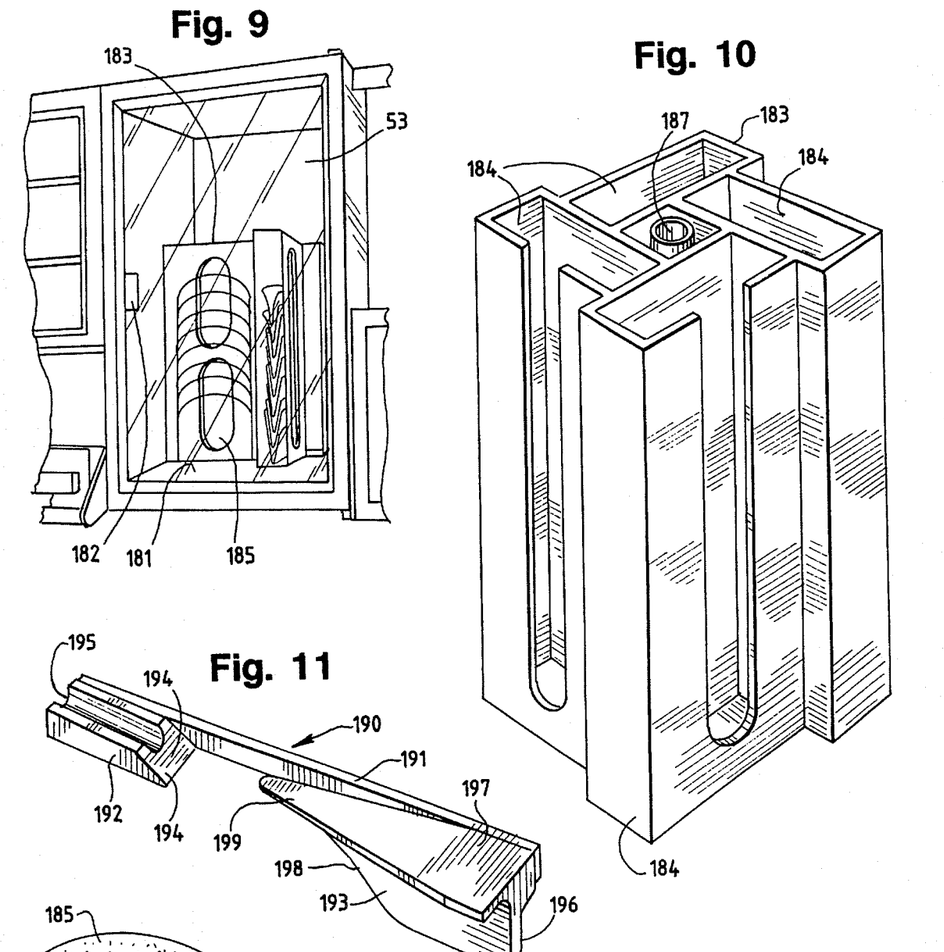
FIG. 9 is a fragmentary perspective view of the taco shell storage compartment.
FIG. 10 is a perspective view of the taco shell carousel.
FIG. 11 is perspective view of the taco shell peeler.

A taco shell carousel 183 is rotatably supported by the shelf 181 and includes four rectangular, vertically extending bins 184 for holding four stacks of nested taco shells 185. One of the bins is aligned with a rectangular slot 186 (FIG. 12) in the shelf so that the taco shells in that bin can be dispensed from the compartment. The ends of the slot are preferably rounded to conform to the shape of the ends of a taco shell. A cylindrical tube 187 extends along the vertical centerline of the carousel and receives a drive shaft which extends upwardly through the shelf 181. The drive shaft rotates the carousel to align another bin with the slot 186 when a sensor senses that a bin is empty. The carousel is advantageously fabricated from stainless steel.

A metal taco shell peeler assembly 190 is reciprocably mounted on the frame below the slot 186 in the shelf 181. The peeler assembly includes an elongated side bar 191, a taco shell support arm 192 which is bolted to one end of the bar 191, and a wedge 193 which is bolted to the other end of the bar 191.

The support arm 192 includes an inclined end surface 194 and a grooved top surface 195. The end of the groove is enlarged to allow a mis-shapened taco shell to be peeled from the stack without breakage. The wedge is somewhat L-shaped in vertical cross-section and includes a flat vertically extending plate 196 and a flat horizontally extending top plate 197. The vertical plate includes a curved wedging or camming edge 198, and the top plate includes a wedged or pointed end 199 which mereges with the top of the edge 198.

Figures 12, 13:
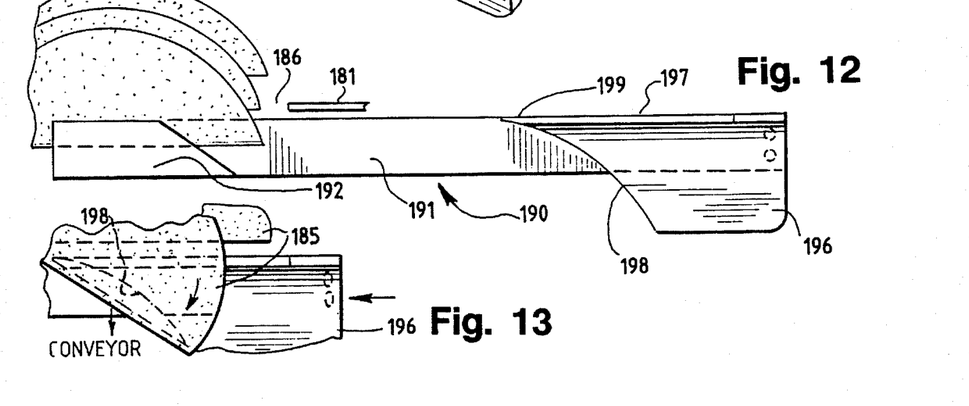
FIG. 12 is a side view of the taco shell peeler and a stack of taco shells.
FIG. 13 is a fragmentary view showing a taco shell being peeled away from the stack.
Figure 14:
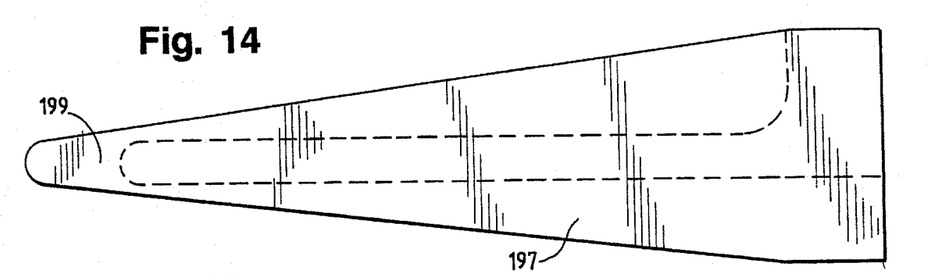
FIG. 14 is a top plan view of the wedge of the taco shell peeler.
Figures 15, 16, 17:
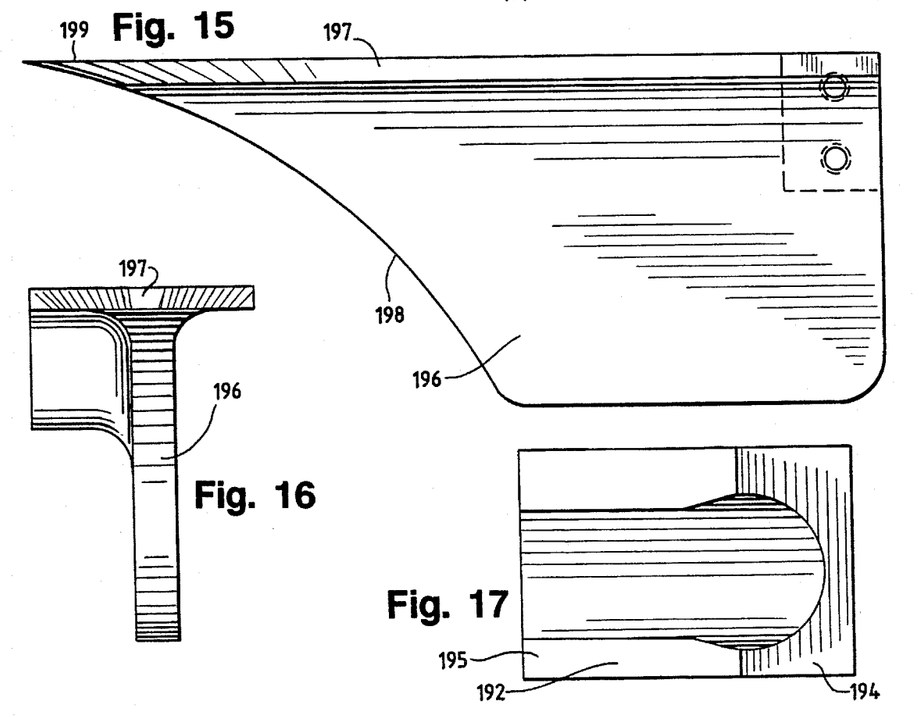
FIG. 15 is a side view of the wedge of the taco shell peeler.
FIG. 16 is an end view of the wedge of the taco shell peeler.
FIG. 17 is a top plan view of the support arm of the taco shell peeler.
Figures 18, 19:
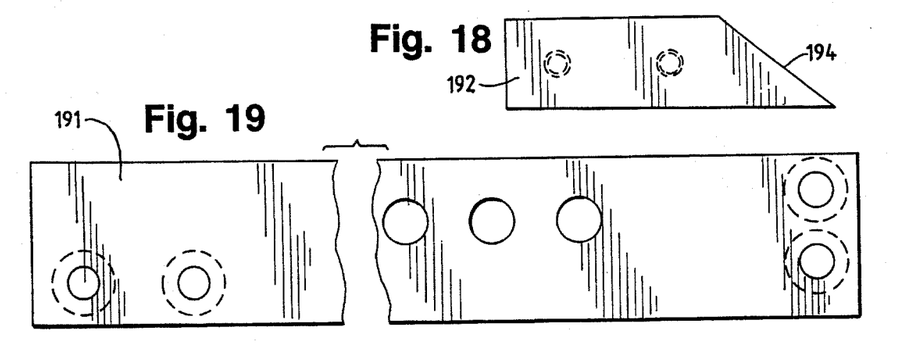
FIG. 18 is a side view of the support arm of the taco shell peeler.
FIG. 19 is a fragmentary side view of the bar of the taco shell peeler.

The peeler assembly is reciprocated by a stepper motor, and the peeler assembly is normally positioned so that the support arm 192 is below the stack of taco shells as illustrated in FIG. 12 and the bottom taco is supported in the groove in the top surface 195.

When the stepper motor which drives the peeler is activated, the peeler moves to the left as illustrated in FIGS. 12 and 13. The distance between the support arm 192 and the pointed end 198 of the wedge relative to the length of the taco shell is such that the pointed end 198 is inserted into the space between the bottom taco shell and the next taco shell before the support arm moves out of supporting engagement with the bottom taco shell. The top surface of the top plate 197 thereby supports the second taco shell and the remaining taco shells in the stack as the peeler continues to move to the left. As the peeler moves left, the wedging edge 198 engages the bottom taco shell and peels the bottom taco shell downwardly away from the second taco shell. The bottom taco shell eventually falls by gravity into the V-shaped conveyor and is transported toward the dispensing stations by the endless belts.

When the peeler moves back to the right, the support arm 192 moves into supporting engagement with the stack of taco shells before the top plate 197 moves out of engagement. The inclined surface 194 on the arm ensures that the support arm can move underneath the stack.

The automatic taco machine can prepare either soft tacos or hard tacos interchangeably. The machine can be controlled by an order processor which instructs the machine to dispense either a soft tortilla or a hard taco shell depending upon the sequence of customers' orders.

The parts of the machine are preferably formed from either stainless steel or food grade plastic so that the parts can be easily sanitized. The parts are readily disassembled for closing.

The completed tacos can be collected manually from the end of the conveyor, or the conveyor can feed the tacos into a packaging machine. In one embodiment of a packaging machine the top belts 65 on the main conveyor are continuous through the packaging station and provide the power to drive the middle and bottom packaging station belts 70. The completed tacos and soft tacos are conveyed into the packaging station. The rear belts on the pulleys 60 are fixed in position, but the front belts on the pulleys 58 move away from the rear belts when a taco or tortilla is in position to allow it to fall or be lowered on the wrapping paper into the gap between the sealing jaws.

The packaging machine uses a roll of cold adhesive wrapping paper that is pulled off its spool by a pair of moving rollers operated by an air cylinder. The paper is fed by two rubber feed rollers through a paper cutter into a slot on the outer sealing jaw when the jaws are in the closed position. It is held in position at the outer jaw by two air operated diaphragms that push the paper against the upper surface of the slot. When the paper has been held in the slot, the jaws are pushed open by an air cylinder to receive the product to be wrapped.

When the machine expects a hard taco, the paper is released by the feed rollers for enough time to allow the weight of the taco to push the correct length of paper down between the jaws. When the machine expects a soft taco, the rollers actually push the correct length of paper down into the gap between the jaws.

After the product is conveyed into the packaging stations its presence is detected by a sensor and the outer section of the conveyor is pushed away to allow the product to fall (hard taco) or to be lowered (soft taco) onto the paper. The jaws are then closed and the paper is sealed along its top and sides by the pressure of the jaws on the pre treated paper. The paper is cut from by the cylindrical paper cutter (same type of cutter as used in a fax machine) that is located above the inner jaws.

As the jaws open again and a new section of paper is placed in position, the wrapped product is pulled away from jaws by a pincher on a motorized screw. The product is pulled across the top of the staging area and then placed at the end of one of two standard vending machine motorized coils. The coils make one revolution every time they receive a taco so they move the wrapped product across the heated staging tray. The tacos are staged in two rows of 13 tacos, one coil is for hard tacos and one for soft tacos.

While in the foregoing specification, a detailed description of a specific embodiment of the invention was set forth for the purpose of illustration, it will be understood that many of the details herein given may be varied considerably by those skilled in the art without departing from the spirit and scope of the invention.

I claim:

1. An apparatus for storing, dispensing, and filling soft tortillas and taco shells comprising:

a frame;

a generally V-shaped conveyor on the frame defining a path for advancing tortillas and taco shells;

a tortilla storage compartment on the frame;

tortilla dispensing means for moving a tortilla from the tortilla storage compartment to the V-shaped conveyor;

a taco shell storage compartment on the frame;

taco shell dispensing means for moving a taco shell from the taco shell storage compartment to the V-shaped conveyor;

means on the frame for storing hot food;

hot food dispensing means adjacent the conveyor for dispensing hot food onto a tortilla or taco shell on the conveyor;

means on the frame for storing cold food; and cold food dispensing means adjacent the conveyor for dispensing cold food onto a tortilla or taco shell on the conveyor.

2. The apparatus of claim 1 in which the conveyor includes first and second sets of a plurality of endless belts, each set of endless belts being supported and driven by a plurality of rotatable pulleys, the pulleys of each set being angularly related so that the sets of endless belts form a V-shaped trough for holding tortillas and taco shells.

3. The application of claim 2 in which the endless belts of each set are spaced apart along the axis of rotation of each of the pulleys of the set.

4. The apparatus of claim 1 including a taco shell carousel rotatably mounted in the taco shell storage compartment, said carousel having a plurality of vertically extending chambers for holding stacks of taco shells, the taco shell storage compartment including a bottom wall below the carousel, the bottom wall having an opening for allowing a taco shell to move downwardly from one of the stacks of taco shells to the conveyor.

5. The apparatus of claim 4 in which said taco shell dispensing means includes a taco peeler slidably mounted below said opening in the bottom wall of the taco shell storage compartment, the taco peeler including a support arm for supporting one of the stacks of taco shells and a wedge having a taco shell support surface and a wedging surface, the peeler being slidable to move the wedge between the bottom taco shell and the next taco shell in a stack of taco shells whereby the wedging surface peels the bottom taco shell away from the next taco shell and the taco shell support surface supports the next taco shell.

6. The apparatus of claim 1 including means for holding a stack of taco shells in said taco shell storage compartment, said taco shell dispensing means including a taco peeler slidably mounted below the stack of taco shells and including a support arm for supporting one of the stacks of taco shells and a wedge having a taco shell support surface and a wedging surface, the peeler being slidable to move the wedge between the bottom taco shell and the next taco shell in a stack of taco shells whereby the wedging surface peels the bottom taco shell away from the next taco shell and the taco shell support surface supports the next taco shell.

7. The apparatus of claim 1 in which said hot food storing means includes a heated compartment, a container for ground meat in the heated compartment, a tube extending from the ground meat container to the hot food dispensing means, and means for pumping ground meat through the tube.

8. The apparatus of claim 7 in which said pumping means comprises a peristaltic pump which squeezes the outside of said tube.

9. The apparatus of claim 7 in which the hot food dispensing means includes a one-way valve connected to said tube.

10. The apparatus of claim 9 in which said one-way valve is a duckbill valve.

11. The apparatus of claim 9 including a heated support member for supporting said valve.

12. The apparatus of claim 1 in which said cold food dispensing means includes a generally vertically extending gate above the conveyor which is pivotally mounted about a generally horizontal axis for movement between a closed position in which the gate holds cold food and an open position in which cold food can fall toward the conveyor, and a generally horizontally extending reciprocably mounted pusher engageable with the gate for pivoting the gate to the open position.

13. The apparatus of claim 12 in which the tortilla dispensing means includes a pick-up head movably mounted on the frame, the pick-up head being provided with a plurality of openings, and means for applying a suction force at said openings whereby a tortilla is held against the pick-up head.

14. The apparatus of claim 13 in which the pick-up head includes top and bottom plates which are secured together to provide an annular chamber therebetween, said openings being provided in the bottom plate below the annular chamber.

* * * * *